United States Patent [19]

Bruning

[11] Patent Number: 5,120,910
[45] Date of Patent: Jun. 9, 1992

[54] MINIMUM-JOINT ELECTRIFIED RAIL SYSTEM

[76] Inventor: Donald D. Bruning, 7137 Carter Trail, Boulder, Colo. 80301

[21] Appl. No.: 569,104

[22] Filed: Aug. 17, 1990

[51] Int. Cl.⁵ .............................................. B60M 1/34
[52] U.S. Cl. ..................... 191/22 DM; 191/29 DM; 238/10 E
[58] Field of Search ............ 191/22 R, 22 C, 22 DM, 191/29 DM; 238/10 E, 14.05

[56] References Cited

U.S. PATENT DOCUMENTS

| | | |
|---|---|---|
| 2,084,322 | 6/1937 | Crane . |
| 2,540,433 | 2/1951 | Evans .......................... 238/10 E X |
| 3,016,845 | 1/1962 | Lemelson . |
| 3,583,631 | 6/1971 | Christiansen . |
| 3,813,502 | 5/1974 | Bommart .................. 191/29 DM X |

FOREIGN PATENT DOCUMENTS

| | | | |
|---|---|---|---|
| 1027124 | 5/1953 | France ................ 238/10 E |
| 70654 | 7/1946 | Sweden ........................ 191/22 DM |
| 256434 | 8/1926 | United Kingdom ......... 191/22 DM |

Primary Examiner—Frank E. Werner
Assistant Examiner—James Eller
Attorney, Agent, or Firm—Homer L. Knearl

[57] ABSTRACT

A composite minimum-joint electrified rail is constructed by combining a non-conductive support rail divided into easily installed segments with a continuous conductive rail that mounts on the support rail and spans any number of support rail segments. The conductive rail may be attached to the non-conductive rail by a tongue and groove arrangement. Multiple conductive rails or strips may be attached to different portions of the same support rail. In addition spring clips are shown for attaching the support rail to railroad ties or roadbed, and fish plates are shown for attaching abutted support rails.

14 Claims, 3 Drawing Sheets

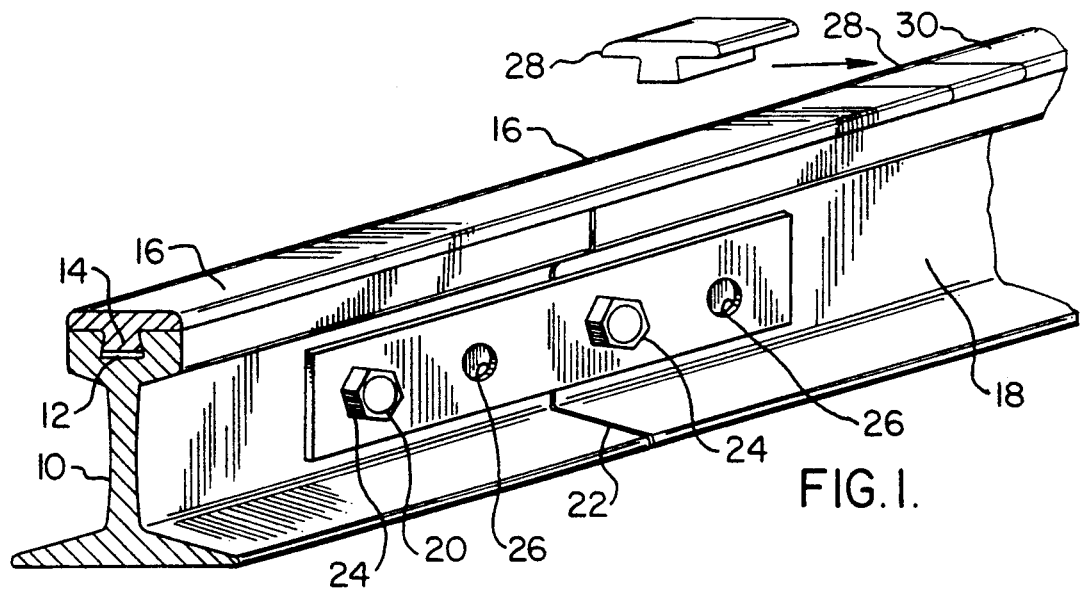
FIG. 1.
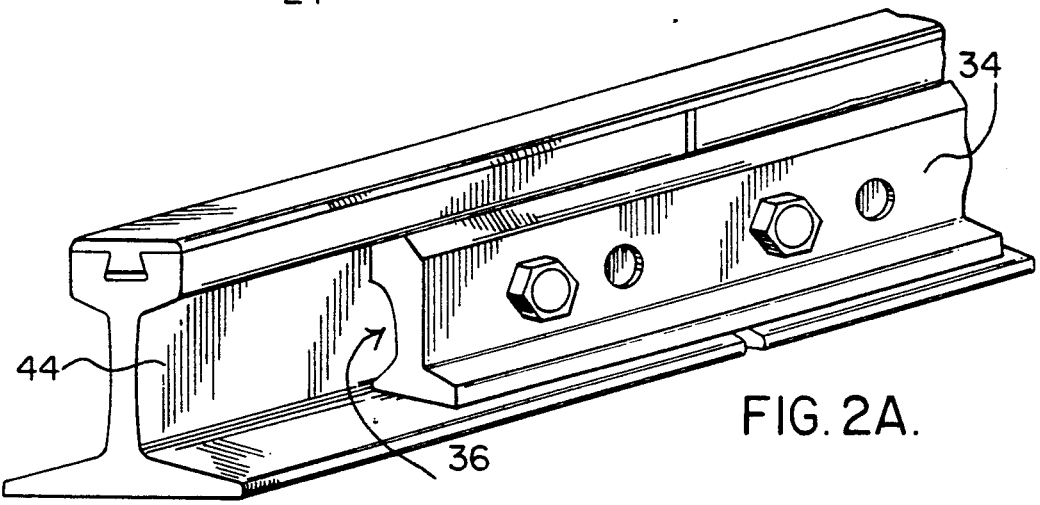
FIG. 2A.
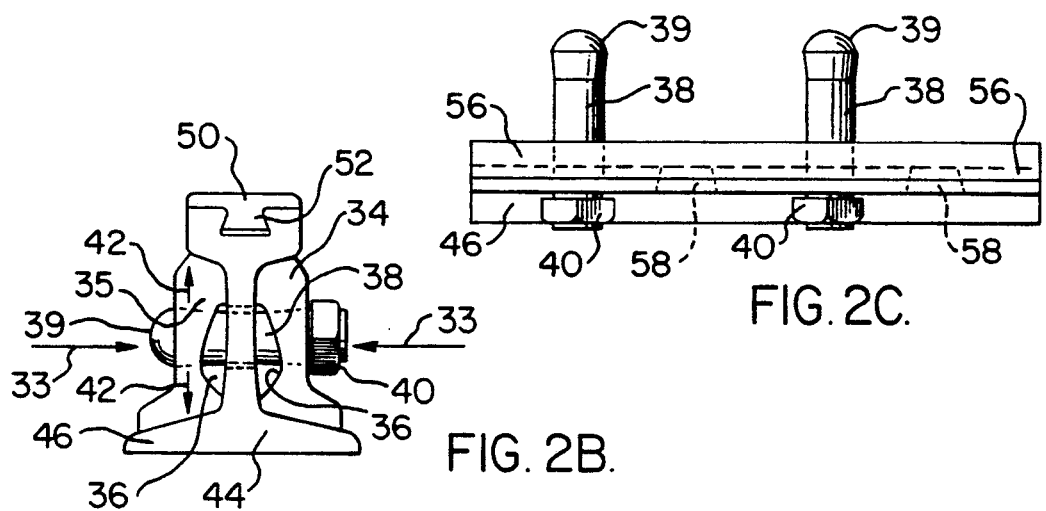
FIG. 2B.
FIG. 2C.

ABSTRACT

MINIMUM-JOINT ELECTRIFIED RAIL SYSTEM

FIELD OF THE INVENTION

This invention relates to electrified rails for a railroad. While the invention has applicability to any scale or type of railroad, it is particularly useful in scale model railroads.

BACKGROUND OF THE INVENTION

A long standing problem in electrified rails in railroads and particularlty in scale model railroads has been how to provide good electrical continuity the full length of the track while segmenting the track into easily installed sections. The electrical continuity between the rail sections in model railroads has been poor.

Typically, the entire rail in a section was made of a conductive material such as brass or aluminum. Abutting sections of rails were connected physcially and electrically by conductive clips that slid over the foot of the "I" cross-sectional shape of both rails at the abutting joint.

The conductivity of these clip connections between rails was dependent on the tightness of the clip as it gripped the abutting rail sections. Inevitably, these clips would make poorer electrical connections as the track was used. The result was that electric engines drawing power from the track would lose electrical power in certain track sections or would receive less power the longer the distance from the electrical power source to the position of the electric engine drawing power from the track. Some solutions for this problem in the past have included track sections that have conductive rails with male/female couplings at the abutment between rail sections. In at least one case, U.S. Pat. No. 3,583,631, the rail body was non-conductive and was covered by conductive channel member having couplings to connect abutting sections or rails. Another solution shown in U.S. Pat. No. 2,084,322 also uses track sections with non-conductive rails covered by conductive channels fitted over the non-conductive rail. In this solution, abutting sections of rails are electrically connected by channel clips that fit over the conductive channels at the abutment joint. Both of these solutions are dependent on a tight fit at the coupling between rail sections to provide good electrical conductivity between abutting rails.

SUMMARY OF THE INVENTION

The electrical continuity problem in sectional rails has been solved by fabricating a composite minimum-joint conductive rail which effectively eliminates the electrical discontinuity across joints between abutting rail sections. This composite minimum-joint conductive rail comprises a sectional non-conductive support rail and a minimum-joint conductive rail member that slideably engages the surface of the support rail and spans the abutment joints between rail sections. An electromotive device riding on the conductive rail and drawing power from it sees no electrical discontinuity across support rail abutment joints. The conductive rail member may be of any length, depending on the length of track to be electrically powered. The conductive rail is fabricated from copper, aluminum, nickel or other conductive materials and is flexible for ease of installation. It gains its physical strength from the sectional non-conductive support rails.

In one aspect of the invention the surface of the non-conductive rail that is to be electrified is shaped to receive the conductive member. After the non-conductive support rail slideably engages the conductive rail, it the support rail serves to guide the flexible conductive member to a similar receiving and guiding means on an abutting support rail.

In another aspect of the invention the length of track may be electrically subdivided into electrical blocks by using conductive rail members whose length corresponds to the electrical block and by separating the ends of the conductive rail members with short insulative rail members that slideably engage the support rails in the same manner as the conductive rail member. The length of electrical blocks is completely independent of the support rail abutment joints.

The support rail may receive multiple conductive rails, members or strips. The conductive strips may share the same surface of the support rail or may be on different surfaces of the support rail.

The conductive rails or strips mate with receiving and guiding means on the support rail in a number of ways. There may be grooves in the support rail and matching beads on the conductive strips that snap into such grooves. The conductive strip may have beveled edges that snap under matching counter-beveled edges on the top surface of the support rail.

BRIEF DESCRIPTION OF DRAWINGS

FIG. 1 shows a preferred embodiment of the minimum-joint conductive rail.

FIGS. 2A, 2B and 2C show a fish plate for connecting abutting support rails and for compressing the support rail to grip the conductive rail.

DETAILED DESCRIPTION OF THE INVENTION

Figure 3A:
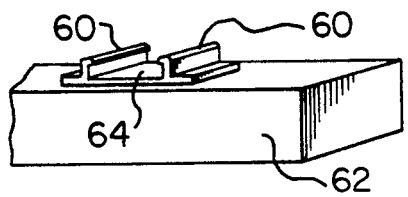
FIG. 3A shows a spring-loaded clip for mounting the support rail on interconnecting ties.

A preferred embodiment of the invention is shown in FIG. 1. Support rail 10 is made of electrically non-conductive or insulative material such as poly-carbonate materials, carbon fibers, ceramics, or combinations thereof. Any insulative material that has sufficient structural strength to support a vehicle on the rail may be used. The top of the support rail 10 contains a notch 12 that runs the length of rail 10. In the preferred embodiment, notch 12 is a dovetail groove. This dovetail groove is designed to receive the dovetail bead 14 of a minimum-joint conductive rail 16 on top of support rail 10.

Support rails 10 are abutted end-to-end to form any desired length of rail in a track system. In FIG. 1, support rail 10 is joined to abutting support rail 18 at joint 22 by fish plate 20 and a matching counterpart fish plate (not shown) on the other side of rails 10 and 18. In a model railroad implementation, the fish plates are preferrably plastic with simulated bolts and nuts molded as a part of each fish plate. Each molded bolt (see FIG. 2C) is a nub 38 molded on the fish plate and snapfits through holes 58 in a matching fish plate on the other side of the rail.

In FIG. 1, nubs (not shown) from the opposite-side fish plate pass through holes in rails 10 and 18 and snapfit through holes 26 in fish plate 20. False nuts 24 are molded into fish plate 20 to simulate real nuts. Of course, in a conventional rail system, the fish plates would have holes at the locations of false nuts 24 for normal nut/bolt fastening of two abutting rails. The continuous conductive member or rail 16 is attached to both rails 10 and 18 by inserting the dovetail bead 14 into matching dovetail groove 12 in the rails. The flat portion of conductive rail 16 rests on the top surface of support rails 10 and 18. The bead 14 of rail 16 riding in groove 12 holds the conductive rail in place. Thus conductive rail 16 spans the support rail abutment joint 22 so that relative to a vehicle or electro-motive device riding on the rail there is no physical discontinuity or electrical discontinuity of the composite minimum-joint conductive rail at joint 22.

The minimum-joint conductive rail 16 terminates at some point along the track where it is desireable to end an electrical control zone. In FIG. 1, rail 16 terminates where it abuts against floating insulator 28. Insulator 28 thus defines the end of one electric control zone or control block defined by conductive rail 16 and the beginning of the next control block defined by conductive rail 30.

Floating insulator 28 has a dovetail bead 32 to engage groove 12 in the support rail in the same manner as conductive rail 16. Insulator 28 and conductive rail 16 float on support rail 18 in that they may slide along the top of rail 18. This allows for expansion and contraction of the conductive rails due to changes in temperature.

FIGS. 2A and 2B show an alternative design for the plastic fish plates. Fish plates 34 and 35 are concave relative to the support rail 44 so that a cavity 36 is formed between plates 34 and 35 and the non-conductive support rails.

As illustrated in end view in FIG. 2B, nub 39 of shaft 38 is pressed through a hole in the fish plate by deforming the fish plates 34 and 35 inward as depicted by arrows 33. Fish plates 34 and 35 are identical; when installed, plate 35 is reversed in direction relative to plate 34. Thus, shafts 38 of one plate extend through holes 58 (FIG. 2C) of the other plate. After nub 39 on shaft 38 of fish plate 34 has snapped through the hole in fish plate 35, plates 34 and 35 are held deformed toward the support rail 44. As a result, plates 34 and 35 want to extend in an upward and downward direction, as depicted by arrows 42, against the foot 46 and head 48 of rail 44. The upward pressure on head 48 of the support rail causes the walls of groove 50 to pinch or grip the dovetail 52 of the conductive rail 54 mounted on the support rail.

FIG. 2C shows details of the fish plate or bracket 34. Shafts 38 and nuts 40 are molded as a part of plate 34. The position of the innermost edge of the concave inner surface of plate 34 is illustrated by dashed line 56. Holes 58 in the plate are tapered to receive the nubs 39 of shafts 38 that snapfit into holes 58. The molded shape of nuts 40 is a matter of choice since they are provided for aesthetics in simulating the appearance of conventional track installation.

FIG. 3A illustrates a clip 64 for holding the support rail to a support member or railroad tie 62. Alternatively, the clip could hold the support rail directly to the roadbed. Clip 64 has spring tension arms 60. A support rail may be snapped into the clip between the arms 64 as shown in FIG. 3B and be held by the clip on tie 62 or a roadbed (not shown).

Figure 3B:
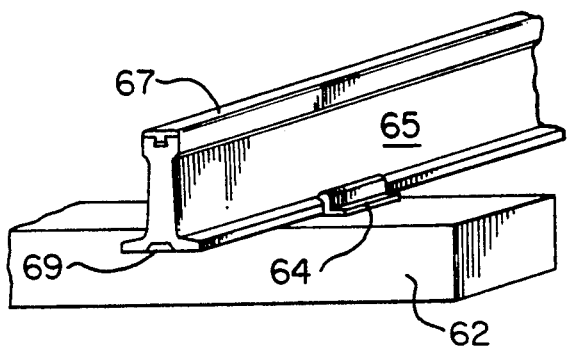
FIG. 3B shows a support rail with two minimum-joint conductive strips, one for providing power to the vehicle and one for providing control signals.

FIG. 3B shows a non-conductive support rail 65 and minimum-joint conductive member 67 similar to rail 16 in FIG. 1. In addition FIG. 3B shows a second conductive strip 69 (shown in end view at the end of the rail) positioned at the bottom of support rail 65. One or more conductive strips 69 might be used to conduct control signals, such as a radio frequency control signals, down the length of the track. Conductive strip 69 would be a continuous or minimum-joint strip in the same manner as conductive strip 67.

Figure 4A:
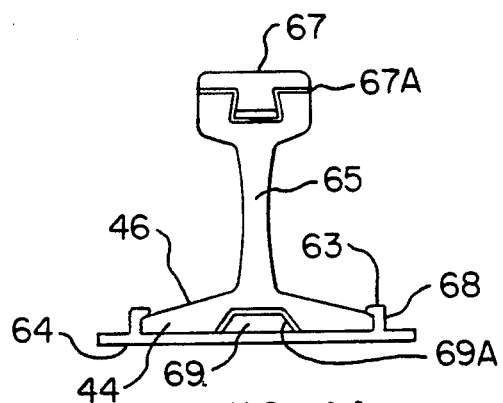
FIG. 4A shows a conductive support rail having insulating layers to insulate the support rail from the minimum-joint conductive strips.

A end view of support rail 65 with conductors 67 and 69 is shown in FIG. 4A. In addition in FIG. 4A, the support rail 65 is made of a conductive metal such as steel, brass, aluminum or tin. In this embodiment with a conductive support rail, there must be an insulating layer 67A and 69A between the support rail 65 and conductors 67 and 69 respectively. Insulating layers 67A and 69A are preferrably coatings of polycarbonate materials. Plastics such as Vinyl or Teflon might be used.

Also shown in the end view in FIG. 4A is a space between the bottom of conductor 67 and the bottom of the dovetail groove. This space is provided so that a electrical wire might be trapped in the space after passing through a hole (not shown) in the support rail. Thus the conductor 67 can receive electrical power from a power source.

Figure 4B:
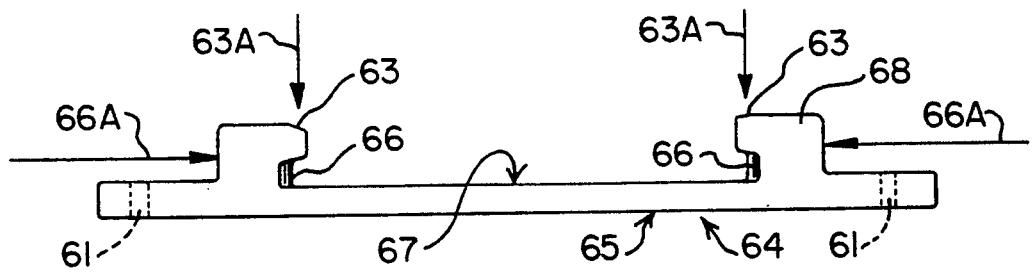
FIGS. 4B and 4C show a preferred embodiment for rail clip for mounting the rail on ties or roadbed.
Figure 4C:
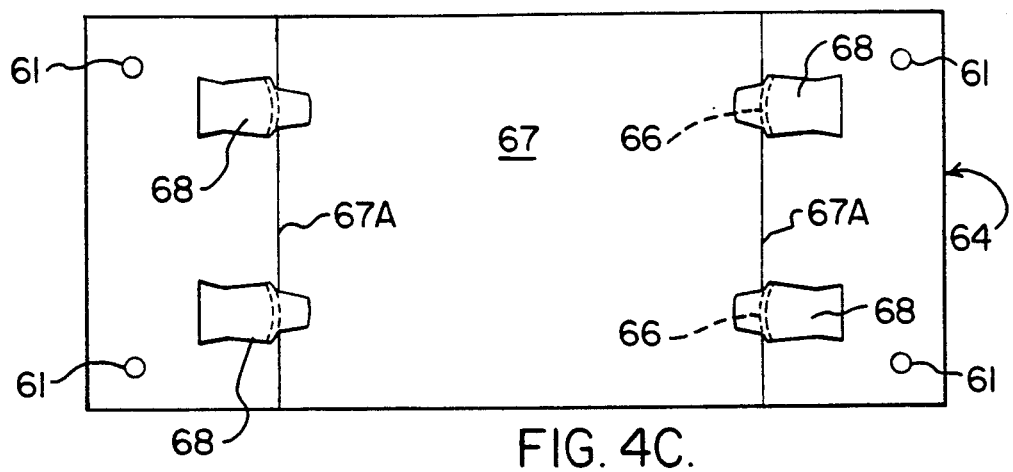

A preferred embodiment of the rail clip 64 is shown in FIGS. 4A, 4B and 4C. Clip 64 is precast or molded out of flexible polycarbonate materials and has posts 68 with ears 63 that snap fit over the base 46 of support rail 44.

In the detail of FIG. 4B, the clip 64 has upstanding posts 68 molded as a single piece with base 65. Upstanding posts 68 have arcuate, vertical-fluted surfaces 66 and ears 63 to hold a rail firmly in place after it is snapped into clip 64. Fluted surfaces 66 would be shaped out of a harder material than the plastic clip and for example might be a metal insert such as steel, brass, or aluminum, molded into the clip. Further the rail base is held in a recessed area 67.

In FIG. 4C, there is a top view of clip 64 in FIG. 4B. Four posts 68 are shown. Arcuate fluted surfaces 66 are shown by dashed lines. The edges 67A of recess 67 are indicated. Also holes 61 in base plate 65 are provided so that the clip 64 can be fastened to railroad ties or roadbed with nails, spikes or bolts through the holes.

When a rail is pushed down into clip 64, base 65 and posts 68 flex to allow posts 68 to open sufficiently for the base of the rail to slip past ears 63. After ears 63 snap over the base of the rail, the rail is kept from moving vertically and is held in recess 67 by ears 63 applying retentive forces in direction of arrows 63A. In addition the rail is kept from slipping transverse to the direction of the rail by the edges of recess 67 and by retentive forces (in the direction of arrows 66A) from the inner arcuate surfaces 66 of posts 68. The rail is kept from slipping along the length of the rail by the vertical fluted surfaces 66.

Figure 5:
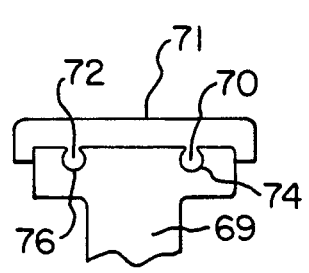
FIG. 5 shows a double cylindrical groove and matching bead for attaching the conductive rail to the nonconductive support rail.
Figure 6:
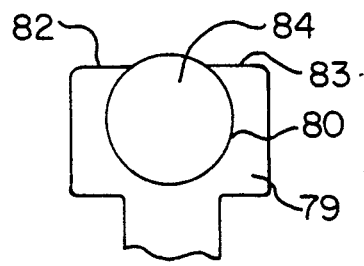
FIG. 6 shows a nonconductive support rail with a dovetail top surface to receive a matching dovetail shaped conductive member.
Figure 7:
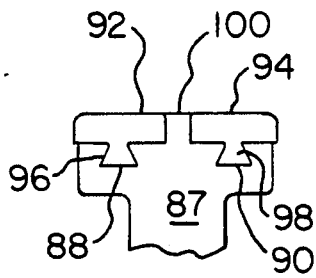
FIG. 7 shows a non-conductive support rail carrying two conductive strips with dovetail beads.

FIGS. 5 through 7 illustrate various alternative embodiments for attaching the minimum-joint conductive strip on top of the nonconductive sectional support rail. In FIG. 5, the conductive strip 71 has two rounded beads 70 and 72 for engaging rounded grooves 74 and 76 respectively in non-conductive support rail 69.

In FIG. 6, the support rail 79 has a top surface containing a cylindrical groove 80 with ears 82 and 83. The minimum-joint conductor 84 has a cylindrical cross-sectional shape. When the conductor 84 is pressed into groove 80, ears 82 and 83 of the groove snap over the conductor. Conductor 84 has a diameter somewhat greater than the depth of groove 80 so that upto 20% of the diameter of the conductor protrudes above the surface of the support rail. This will insure good electrical contact between the conductive strip and wheels electro-motive device drawing power from the rail.

In FIG. 7, the support rail 87 has two dovetail grooves 88 and 90 to engage two conductive strips 92 and 94 respectively. Strips 92 and 94 each have a dovetail bead 96 and 98 for engaging dovetail grooves 88 and 90. Strips 92 and 94 are insulated from each other by a ridge 100 on the top of the non-conductive support rail 87.

Figure 8:
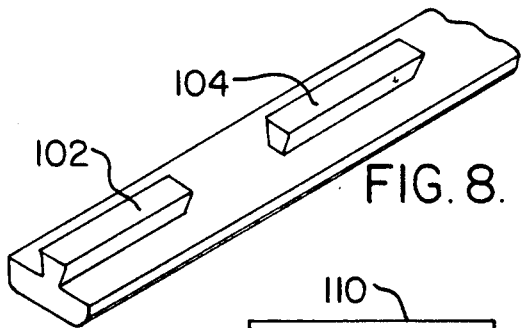
FIG. 8 is the bottom view of a conductive rail with beads at spaced intervals.

In FIG. 8, an alternative embodiment of the minimum-joint conductive rail is shown. In this embodiment, the dovetail bead 102 is discontinuous. The bead need not extend the length of the conductive strip. There only needs to be a bead at spaced intervals. Two beads 102 and 104 are shown. The interval between beads should be short enough so that good engagement with the support rail is maintained when the conductive rail is snapped into the matching groove in the non-conductive support rail.

Figure 9:
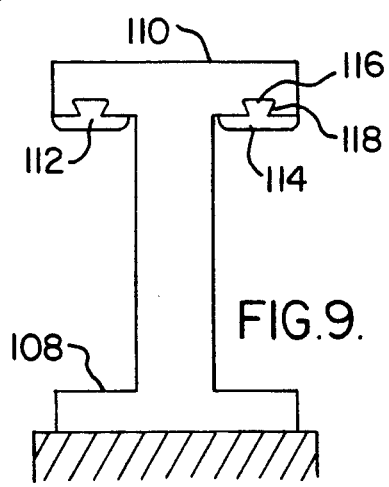
FIG. 9 shows a mono-rail embodiment where the support rail carries two minimum-joint conductive rails.
Figure 10:
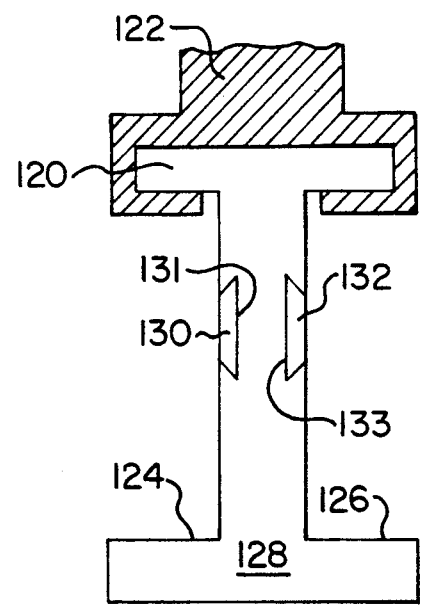
FIG. 10 shows a hanging mono-rail embodiment where the minimum-joint conductive strips are attached to vertical portion of the I-beam.

FIGS. 9 and 10 illustrate attachment of minimum-joint conductive strips to sectional non-conductive mono-rails. As in FIG. 1 the non-conductive mono-rail would be built of strong relatively stiff material to support the weight of the vehicle travelling on the rail. Accordingly, the mono-rail would be in sections which would be assembled to form a track. The conductive strips would be flexible and of any length and would span any number of mono-rail sections thereby providing electrical continuity for a predetermined length of track.

In the mono-rail illustrated as an end view in FIG. 9, the rail is supported at the base 108 by pylons or a roadbed in cross- section. The electro-motive vehicle rides on the top surface 110 of the rail and carries two electrical conductive wipers or wheels which make contact with conductive strips 112 and 114. The continuous conductive strips have a dovetail bead 116 and snap into a matching dovetail groove 118.

In the mono-rail illustrated as an end view in FIG. 10, the rail is supported at the top 120 of the I-beam by hanging support 122 in cross-section. The electro-motive vehicle rides on wheels running on the top surfaces 124 and 126 of the base 128 of the I-beam. The vehicle also carries two electrical conductive wipers or wheels which make contact with conductive strips 130 and 132. The continuous conductive strips have a dovetail shape and snap into a matching dovetail grooves 131 and 133 respectively.

While a number of preferred embodiments of the invention have been shown and described, it will be appreciated by one skilled in the art, that a number of further variations or modifications may be made without departing from the spirit and scope of my invention.

What is claimed is:

1. A composite minimum-joint conductive rail for supplying electrical power to an electro-motive device riding on the composite rail, said composite rail comprising:
   a plurality of non-conductive support rails;
   means for joining multiple support rails in end-to-end abutment to form a track of any length having multiple abutted joints;
   a continuous conductive rail member for conducting electrical power along the support rails and across the multiple abutted joints of said support rails, said conductive rail member having a length independent of the positions of the abutted joints of said support rails;
   each of said support rails having a support surface for slideably engaging and supporting said conductive rail member, whereby said continuous conductive rail member slides relative to said support surface as said conductor rail member expands or contracts, and whereby when the electromotive device rides on the composite rail, the electromotive device is supported by the support rails and draws electrical power from the continuous conductive rail member.

2. The composite rail of claim 1 wherein
said support surface has a cross-section shape designed to mate with a cross-sectional shape of the conductive rail member, said support surface receiving and guiding the continuous conductive rail member across a plurality of abutted non-conductive support rails.

3. The composite rail of claim 2 wherein the cross-sectional shape of said support surface is a dovetail groove.

4. The composite rail of claim 2 wherein the cross-sectional shape of said support surface is a groove shaped as the major chord of a cylinder.

5. The composite rail of claim 2 wherein said support surface contains multiple grooves.

6. The composite rail of claim 1 wherein at least a portion of said continuous conductive rail member is shaped for mating with a portion of said support surface.

7. The composite rail of claim 6 wherein:
   a body portion of the conductive rail member rests on said support surface of said non-conductive support rails; and
   a bead portion of the conductive rail member slideably engages the mating portion of said support surface of said non-conductive rails.

8. The composite rail of claim 7 wherein said bead portion of said conductive member is discontinuous.

9. The composite rail of claim 1 wherein each of said support rails has at least one dovetail groove in he surface of said support rail running the length of said support rail for slideable engagement with a dovetail bead on the continuous conductive rail member whereby the conductive rail member is mounted on the non-conductive support rail.

10. The composite rail of claim 1 wherein each of said support rails has at least one cylindrical groove in the surface of said support rail running the length of said support rail in which a cylindrical bead on the continuous conductive rail member slideably engages.

11. The composite rail of claim 1 wherein:
each of said support rails has at least one cylindrical groove in the surface of said support rail running the length of said support rail; and
said continuous conductive rail member is a cylindrical conductor that fits in said cylindrical groove and protrudes above the surface of the non-conductive support rail.

12. The composite rail of claim 1 wherein each of said support rails has beveled edges in a top surface thereof and lateral counter-beveled edges of the continuous conductive rail member engage the beveled edges of the support rails.

13. The composite rail of claim 1 wherein said composite rail is subdivided into more than one electrical control block and comprising:
a plurality of said continuous conductive rail members, the length of each conductive rail member corresponding to a portion of the track in an electrical control block;
an insulative spacer rail member separating abutting conductive rail members at the end of each control block, said spacer rail member engaged and supported by the support rails in the same manner as the conductive rail members, the position of the spacer member along the track being independent of the abutted joints between the support rails.

14. The composite rail of claim 1 and in addition:
one or more additional continuous conductive rail members for conducting power along the support rails and across multiple abutted joints of said support rails, said additional conductive rail members having a length independent of the position of the abutted joints of said support rails;
each of said support rails having an additional surface for slideably engaging and supporting each of said additional conductive rail members whereby the electromotive device rides on the composite rail, is supported by the support rails and draws electrical power from two or more continuous conductive rail members.

* * * * *